US012449288B2

(12) United States Patent
Simeoni et al.

(10) Patent No.: US 12,449,288 B2
(45) Date of Patent: Oct. 21, 2025

(54) FLOW CONDITION TESTING PROCEDURE OF AN ASPIRATING SMOKE DETECTOR DEVICE

(71) Applicant: Honeywell International Inc., Charlotte, NC (US)

(72) Inventors: Erika Simeoni, Trieste (IT); Mauro Miheli, Trieste (IT); Giuseppe Premarini, Trieste (IT); Domenico Piro, Trieste (IT); Arturo Paderno, Trieste (IT)

(73) Assignee: Honeywell International Inc., Charlotte, NC (US)

( * ) Notice: Subject to any disclaimer, the term of this patent is extended or adjusted under 35 U.S.C. 154(b) by 196 days.

(21) Appl. No.: 17/667,917

(22) Filed: Feb. 9, 2022

(65) Prior Publication Data

US 2023/0251117 A1 Aug. 10, 2023

(51) Int. Cl.
| | | |
|---|---|---|
| G01F 15/00 | (2006.01) | |
| G01F 1/66 | (2022.01) | |
| G01F 15/06 | (2022.01) | |
| G01F 15/061 | (2022.01) | |

(52) U.S. Cl.
CPC .............. *G01F 1/66* (2013.01); *G01F 15/061* (2013.01); *G01F 15/068* (2013.01)

(58) Field of Classification Search
CPC ........ G01F 1/66; G01F 15/061; G01F 15/068; G08B 17/10; G08B 29/145; G08B 5/36
USPC ........... 73/1.02, 1.16–1.36, 31.01–31.03, 40, 73/40.5 R, 40.5 A, 49.1, 861, 195–227, 73/865.8; 340/628–630, 605, 606, 608
See application file for complete search history.

(56) References Cited

U.S. PATENT DOCUMENTS

| | | |
|---|---|---|
| 10,302,522 B2 | 5/2019 | Williamson et al. |
| 2015/0310717 A1 | 10/2015 | Al-Farra et al. |
| 2021/0209916 A1* | 7/2021 | Anzziani ............... G08B 29/20 |
| 2021/0348982 A1 | 11/2021 | Moix |

FOREIGN PATENT DOCUMENTS

| | | | | |
|---|---|---|---|---|
| AU | 2014290556 | * | 2/2016 | |
| CA | 2886675 A1 | * | 4/2024 | ............... G01F 1/66 |
| CN | 104903941 A | | 9/2015 | |
| CN | 105917208 A | * | 8/2016 | ........... G01M 3/2815 |
| CN | 212460761 U | * | 2/2021 | |
| CN | 112900946 | * | 6/2021 | |
| CN | 112950883 | * | 6/2021 | |
| CN | 115775444 A | * | 3/2023 | ........... G06F 3/0484 |
| DE | 102006023048 | * | 12/2014 | |
| EP | 3783581 A1 | * | 2/2021 | ............. G08B 17/10 |
| EP | 3825972 | * | 5/2021 | |
| RU | 2534942 | * | 12/2014 | |
| WO | 2015009940 | * | 1/2015 | |
| WO | WO-2021056074 A1 | * | 4/2021 | |

* cited by examiner

*Primary Examiner* — Robert R Raevis
(74) *Attorney, Agent, or Firm* — Brooks, Cameron & Huebsch, PLLC

(57) ABSTRACT

Methods, devices, and systems for a flow condition testing procedure of an aspirating smoke detector device are described herein. One device includes a blower to draw gas into an aspirating smoke detector device, a sensor, a memory, and a processor to execute executable instructions stored in the memory to determine, via the sensor, a flow rate of the gas into the aspirating smoke detector device, determine a flow condition based on the determined flow rate, and cause the flow condition to be displayed.

9 Claims, 5 Drawing Sheets

FLOW CONDITION TESTING PROCEDURE OF AN ASPIRATING SMOKE DETECTOR DEVICE

TECHNICAL FIELD

The present disclosure relates to methods, devices, and systems for a flow condition testing procedure of an aspirating smoke detector device.

BACKGROUND

Facilities (e.g., buildings), such as commercial facilities, office buildings, hospitals, and the like, can have an alarm system that can be triggered during an emergency situation (e.g., a fire) to warn occupants to evacuate. For example, an alarm system may include a control panel (e.g., a fire control panel) and a plurality of aspirating smoke detector devices located throughout the facility (e.g., on different floors and/or in different rooms of the facility) that detect a hazard event, such as smoke generation (e.g., as the result of a fire or otherwise). The aspirating smoke detector can transmit a signal to the control panel in order to notify a building manager, occupants of the facility, emergency services, and/or others of the hazard event via alarms or other mechanisms.

DETAILED DESCRIPTION

Figure 1:
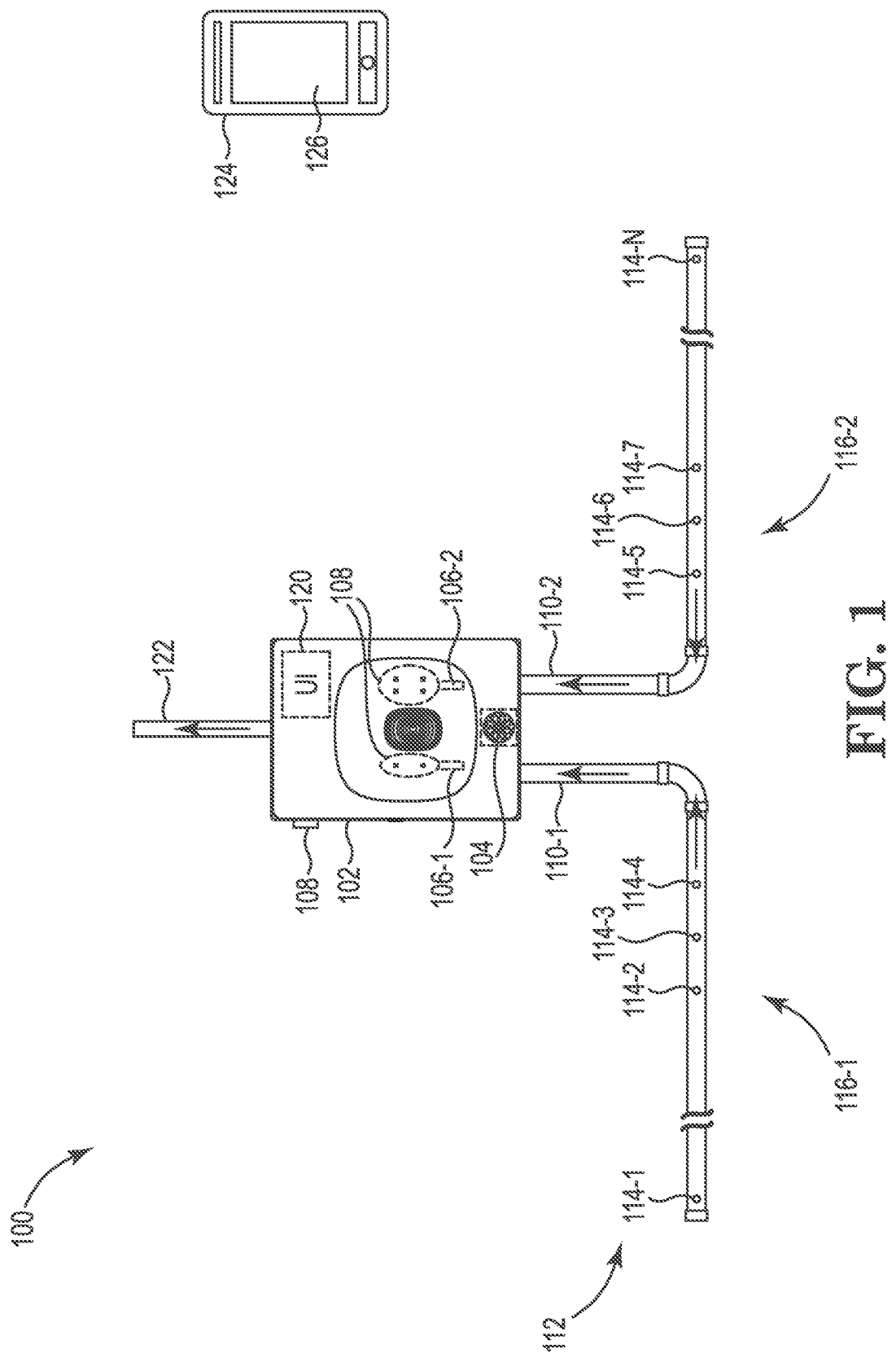
FIG. 1 is a system for a flow condition testing procedure of an aspirating smoke detector device, in accordance with one or more embodiments of the present disclosure.

Methods, devices, and systems for a flow condition testing procedure of an aspirating smoke detector device are described herein. One device includes a blower to draw gas into an aspirating smoke detector device, a sensor, a memory, and a processor to execute executable instructions stored in the memory to determine, via the sensor, a flow rate of the gas into the aspirating smoke detector device, determine a flow condition based on the determined flow rate, and cause the flow condition to be displayed.

An aspirating smoke detector device can be utilized in a facility to detect a hazard event by detecting the presence of smoke. The aspirating smoke detector device can draw gas (e.g., air, via a blower) from the facility into a sensor through a network of pipes throughout the facility. The network of pipes can comprise a pipe sampling network. The sensor can sample the gas from the pipe sampling network in order to determine whether the gas sampled from the facility includes smoke particles. In response to detection of smoke particles, the aspirating smoke detector device can transmit a signal to a control panel in the facility to signal detection of smoke particles in the area of the facility the aspirating smoke detector is monitoring and sampling gas from.

As mentioned above, in order for the aspirating smoke detector device to sample gas for smoke particles, the gas has to be transported from the sampling location to the aspirating smoke detector device. Accordingly, the aspirating smoke detector device can utilize the network of pipes throughout the facility to transport sampled gas to the aspirating smoke detector device. For example, the pipe sampling network can transport gas from an area of the facility to the aspirating smoke detector device for testing. It can be important that the pipe sampling network has minimal to zero leakage so that gas drawn from a sampling point in an area of the facility does not leak out of the pipe sampling network, or gas outside of the pipe sampling network does not enter the pipe sampling network in locations other than the sampling location. Such leakage may cause the aspirating smoke detector to not detect a fire event in an area in which it is monitoring (e.g., in the event gas from the area leaks out of the pipe sampling network), and/or cause the aspirating smoke detector device to falsely detect a fire in an area in which the aspirating smoke detector device is not monitoring (e.g., in the event gas from a different area of the facility leaks into the pipe sampling network).

Accordingly, during installation, commissioning, and/or normal operation of the aspirating smoke detection system (e.g., the aspirating smoke detector device and the pipe sampling network), a flow condition testing procedure of the aspirating smoke detector device and the pipe sampling network can be performed to check for such leaks. Such a testing procedure can identify these leaks in the pipe sampling network, which may have occurred as a result of incorrect installation of the pipe sampling network such as at pipe connections and/or junctions, cracks, in the pipes and/or junctions, and/or as a result of any other type of damage to the system in a way that is easier and more convenient as well as without using specialized tools such as a flowmeter, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2.

FIG. 1 is a system 100 for a flow condition testing procedure of an aspirating smoke detector device 102, in accordance with one or more embodiments of the present disclosure. As illustrated in FIG. 1, system 100 can include an aspirating smoke detector device 102, a pipe sampling network 112, inlet pipes 110-1, 110-2, exhaust pipe 122, and mobile device 124.

As mentioned above, the system 100 can include a pipe sampling network 112. As used herein, the term "pipe sampling network" refers to a group of pipes configured to take samples of gas at a sampling location and transport the gas from the sampling location to a detector. For example, the pipe sampling network 112 can sample gas at sampling locations 116-1 and/or 116-2 and transport the gas to the aspirating smoke detector device 102 for analysis. The pipe sampling network 112 can include sampling ports 114-1, 114-2, 114-3, 114-4, 114-5, 114-6, 114-7, 114-N (referred to collectively herein as sampling ports 114). As used herein, the term "port" refers to an aperture in a pipe. The sampling ports 114 can accordingly allow for gas to flow from an area in the facility into the pipe sampling network 112. For instance, gas at the sampling location 116-1 can flow into the pipe sampling network 112 via the sampling ports 114-1, 114-2, 114-3, 114-4, and gas at the sampling location 116-2 can flow into the pipe sampling network 112 via the sampling ports 114-5, 114-6, 114-7, 114-N.

As mentioned above, it is important that gas sampled at the sampling locations 116-1 and/or 116-2 is drawn into the pipe sampling network 112, that the sampled gas does not leak out of the pipe sampling network 112. Additionally, it is important that gas outside of the pipe sampling network 112 does enter the pipe sampling network 112 in locations other than the sampling ports 114. Accordingly, a flow condition testing procedure of the aspirating smoke detector device 102 can be performed to ensure such leaks are not present in the pipe sampling network 112, as is further described herein.

In order to perform the flow condition testing procedure, the sampling ports 114 can be obstructed. Such obstruction can prevent gas outside of the pipe sampling network 112 at the sampling locations 116-1 and/or 116-2 (e.g., and/or at any other location) does not enter the pipe sampling network 112 during the flow condition testing procedure. The sampling ports 114 may be obstructed in various ways. For instance, in some examples, the sampling ports 114 may be obstructed via plugs. In other examples, the sampling ports 114 may be obstructed via tape. Further, the sampling ports 114 may be obstructed via a combination of plugs and/or tape, and/or may be obstructed via any other means to prevent gas from outside of the pipe sampling network 112 entering the pipe sampling network 112 during the flow condition testing procedure.

As illustrated in FIG. 1, the system 100 further includes inlet pipes 110-1, 110-2. As used herein, the term "inlet pipe" refers to a hollow device used for the conveyance of gas into a device. For example, the inlet pipes 110-1, 110-2 can be connected to the pipe sampling network 112 and convey gas sampled at the sampling locations 116-1, 116-2 into the aspirating smoke detector device 102.

The system 100 further includes the aspirating smoke detector device 102. As mentioned above, the aspirating smoke detector device 102 can detect smoke within gas sampled from the sampling locations 116-1, 116-2 in the facility. The flow condition testing procedure can be performed by the aspirating smoke detector device 102, as is further described herein.

The aspirating smoke detector device 102 can include a blower 104. As used herein, the term "blower" refers to a mechanical device for moving gas in a particular direction. For example, the blower 104 can be utilized to draw gas through the pipe sampling network 112 and into the aspirating smoke detector device 102 through the inlet pipes 110-1 and/or 110-2. The blower 104 can, in some instances, comprise a ducted housing having a fan that, when spinning, causes gas (e.g., such as air) to flow in a particular direction.

Additionally, the aspirating smoke detector device 102 can include sensors 106-1 and/or 106-2. The sensors 106-1 and/or 106-2 can be flow sensors that can determine the flow rate of the gas through the aspirating smoke detector device 102. In some examples, the sensors 106-1 and/or 106-2 can be ultrasonic sensors.

To display information relating to operation of the aspirating smoke detector device 102, the aspirating smoke detector device 102 can include a number of light emitting diodes (LEDs) 108. The number of LEDs 108 can be oriented on the aspirating smoke detector device 102 such that a user can view the number of LEDs 108. The number of LEDs 108 that are turned on and the color they emit can allow a user to determine information about the operation of the aspirating smoke detector device 102, such as the results of the flow condition testing procedure, as is further described herein and in connection with FIGS. 2-4.

In some embodiments, the aspirating smoke detector device 102 can include a user interface (UI) 120 (e.g., illustrated as such utilizing the dashed lines as seen in FIG. 1). The UI 120 can present information to a user about the operation of the aspirating smoke detector device 102, such as the results of the flow condition testing procedure, as is further described herein and in connection with FIGS. 2-4.

Although not illustrated in FIG. 1 for clarity and so as not to obscure embodiments of the present disclosure, the aspirating smoke detector device 102 further includes a processor configured to execute instructions stored in a memory to perform actions relating to operation of the aspirating smoke detector device 102. For example, the processor can perform a flow condition testing procedure of the aspirating smoke detector device 102, as is further described herein.

In order to perform the flow condition testing procedure, the processor can determine, via the sensors 106-1, 106-2, the flow rate of the gas into the aspirating smoke detector device 102 during the flow condition testing procedure. As used herein, the term "flow condition" refers to a state of movement of gas through a pipe sampling network. The state of the movement of gas through the pipe sampling network 112 can be an indication of whether there are leaks in the pipe sampling network 112 or not, which can be determined using the flow condition testing procedure as is further described herein.

With the sampling ports 114 obstructed, the aspirating smoke detector device 102 can begin the flow condition testing procedure by causing the blower 104 to draw gas from the pipe sampling network 112 into the aspirating smoke detector device 102. As the blower 104 draws gas through the pipe sampling network 112, gas existing in the pipe sampling network 112 is drawn into and through the aspirating smoke detector device 102. As the gas is drawn into the aspirating smoke detector device 102 with the sampling ports 114 obstructed, if there are minimal to no leaks in the pipe sampling network 112, a low-pressure condition should begin to form in the pipe sampling network 112, resulting in a low flow rate through the aspirating smoke detector device 102. As an example, the sensor 106-1 can determine the flow rate of the gas into the aspirating smoke detector device 102 (e.g., via the inlet pipe 110-1) to be 0.5 liters per minute (L/min).

In order to determine a flow condition of the pipe sampling network 112, the processor can compare the determined flow rate of the gas to a threshold flow rate. Using the example above, the processor can compare the determined flow rate of the gas (e.g., 0.5 L/min) to a threshold flow rate (e.g., 1 L/min) and determine that the flow rate is below the threshold flow rate. Additionally, the processor can determine whether the flow rate is below the threshold flow rate for a predetermined period of time. The predetermined period of time can allow for the low-pressure condition to sufficiently form. For example, with the flow rate of the gas (e.g., 0.5 L/min) being below the threshold flow rate (e.g., 1 L/min) for at least five minutes (e.g., the predetermined period of time), the processor can determine the flow condition to be a good flow condition. The good flow condition can indicate that gas outside of the pipe sampling network 112 is not entering the pipe sampling network during the flow condition testing procedure. As such, the good flow condition can indicate that there are minimal to no leaks in the pipe sampling network 112.

As another example, with the sampling ports 114 obstructed the aspirating smoke detector device 102 can begin the flow condition testing procedure by causing the blower 104 to draw gas from the pipe sampling network 112 into the aspirating smoke detector device 102. Again, as the blower 104 draws gas through the pipe sampling network 112, gas existing in the pipe sampling network 112 is drawn into and through the aspirating smoke detector device 102. As the gas is drawn into the aspirating smoke detector device 102 with the sampling ports 114 obstructed, if there are any leaks in the pipe sampling network 112, a sufficient low-pressure condition will not form in the pipe sampling network 112, resulting in a higher flow rate through the aspirating smoke detector device 102 than would result if there were minimal to no leaks in the pipe sampling network 112. As an example, the sensor 106-1 can determine the flow rate of the gas into the aspirating smoke detector device 102 (e.g., via the inlet pipe 110-1) to be 3 liters per minute (L/min).

In order to determine a flow condition of the pipe sampling network 112, the processor can compare the determined flow rate of the gas to a threshold flow rate. Using the second example above, the processor can compare the determined flow rate of the gas (e.g., 3 L/min) to a threshold flow rate (e.g., 1 L/min) and determine that the flow rate is above the threshold flow rate. Additionally, the processor can determine whether the flow rate is above the threshold flow rate for a predetermined period of time. For example, with the flow rate of the gas (e.g., 3 L/min) being above the threshold flow rate (e.g., 1 L/min) for at least five minutes (e.g., the predetermined period of time), the processor can determine the flow condition to be a bad flow condition. The bad flow condition can indicate that gas outside of the pipe sampling network 112 is entering the pipe sampling network during the flow condition testing procedure. As such, the bad flow condition can indicate that there is a leak in the pipe sampling network 112.

When the flow condition is determined, the processor can cause the flow condition to be displayed. For example, the flow condition can be displayed via the number of LEDs 108. For instance, if the flow condition is determined to be a good flow condition, various ones of the LEDs 108 can light up. If the flow condition is determined to be a bad flow condition, different combinations of the LEDs 108 can light up. In some examples, the various ones of the LEDs 108 can light up a particular color (e.g., green for a good flow condition, red for a bad flow condition). Such LED combinations are further described in connection with FIGS. 2-4.

In embodiments in which the aspirating smoke detector device 102 includes the UI 120, the processor can cause the flow rate and the flow condition to be displayed via the UI 120. For example, if the flow rate is determined to be 0.5 L/min and the flow condition determined to be a good flow condition, the UI 120 can display the flow rate as 0.5 L/min and the flow condition to be a good flow condition.

In some embodiments, in order to initiate the flow condition testing procedure, the aspirating smoke detector device 102 can include button 118. When an input is received via the button 118 (e.g., a user presses the button 118), the aspirating smoke detector device 102 can execute the flow condition testing procedure.

As illustrated in FIG. 1, the system 100 can optionally include a mobile device 124. The mobile device 124 can be connected to the aspirating smoke detector device via a network relationship, such as a wired or wireless connection. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

The mobile device 124 can include a UI 126. In some embodiments, the flow rate and the flow condition can be displayed via the UI 126 of the mobile device 124. For example, if the flow rate is determined to be 0.5 L/min and the flow condition determined to be a good flow condition, the UI 126 can display the flow rate as 0.5 L/min and the flow condition to be a good flow condition.

Additionally, in some embodiments, in order to initiate the flow condition testing procedure, the UI 126 of the mobile device can receive an input. When the input is received via the UI 126, the mobile device 124 can cause the aspirating smoke detector device 102 to execute the flow condition testing procedure. Accordingly, the mobile device 124 can be utilized to initiate the flow condition testing procedure.

Figure 2:
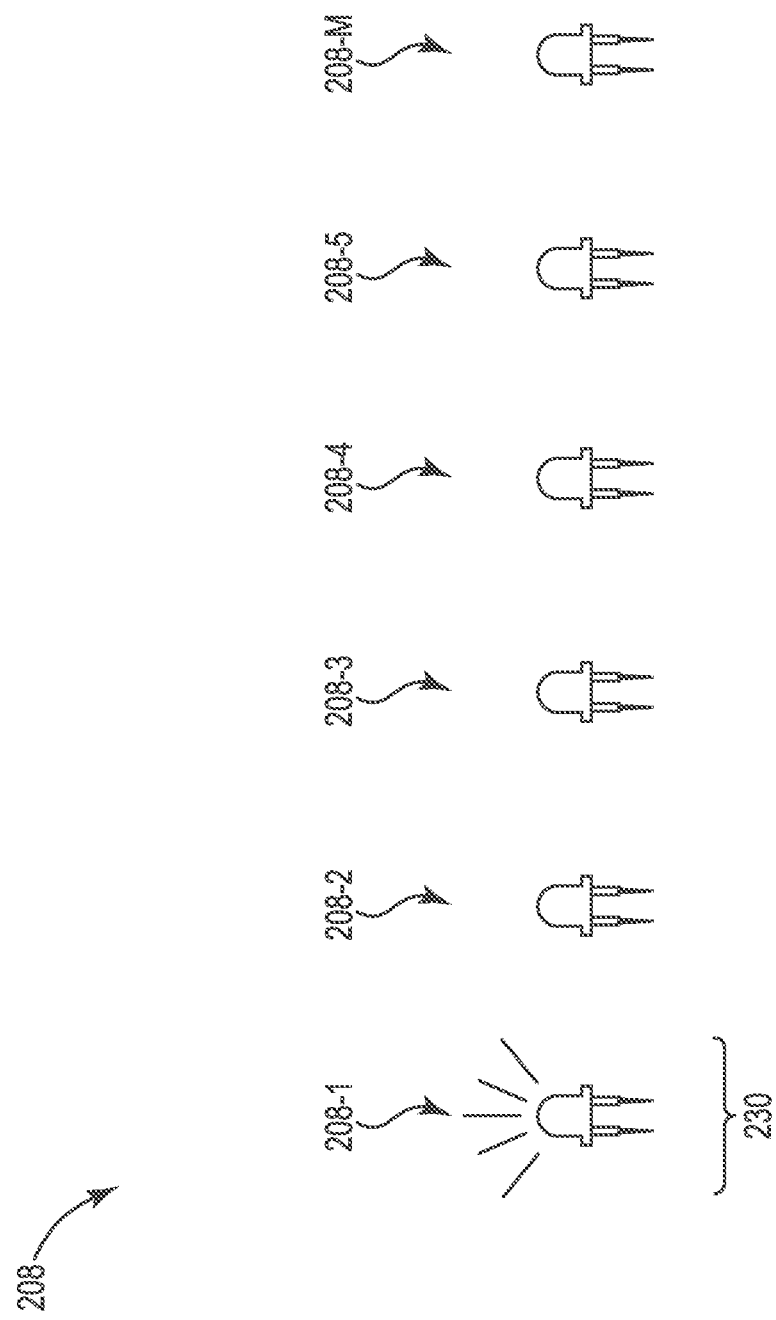
FIG. 2 is a number of light emitting diodes (LEDs) displaying a good flow condition from a flow condition testing procedure of an aspirating smoke detector device, in accordance with one or more embodiments of the present disclosure.

FIG. 2 is a number of light emitting diodes (LEDs) 208 displaying a good flow condition from a flow condition testing procedure of an aspirating smoke detector device, in accordance with one or more embodiments of the present disclosure. The LEDs 208-1, 208-2, 208-3, 208-4, 208-5, 208-M (referred to collectively herein as LEDs 208) can include a first group 230 of LEDs 208.

As previously described in connection with FIG. 1, an aspirating smoke detector device can perform a flow condition testing procedure. For example, a determined flow rate of a gas (e.g., 0.4 L/min) can be compared with a threshold flow rate (e.g., 1 L/min) to determine whether the determined flow rate is above or below the threshold flow rate for a predetermined period of time. In an example in which the determined flow rate is below the threshold flow rate for the predetermined period of time, the aspirating smoke detector device can determine the flow condition to be a good flow condition. The aspirating smoke detector device can utilize the LEDs 208 included in the aspirating smoke detector device to display the flow condition, as is further described herein.

For example, the aspirating smoke detector device can cause a first group 230 of LEDs 208 to emit a first color in response to the flow rate being within a first flow rate range, where the first color corresponds to a good flow condition. For example, the first flow rate range can be 0 L/min to 0.5 L/min. As the determined flow rate is 0.4 L/min, the aspirating smoke detector device can determine the flow rate is within the first flow rate range (e.g., and less than the threshold flow rate of 1 L/min). Accordingly, the aspirating smoke detector device can cause the LED 208-1 (e.g., the first group 230 of LEDs 208) to light up a first color (e.g., green) to indicate the flow rate is within the first flow rate range, is below the threshold flow rate for a predetermined period of time, and the flow condition is a good flow condition.

Figure 3:
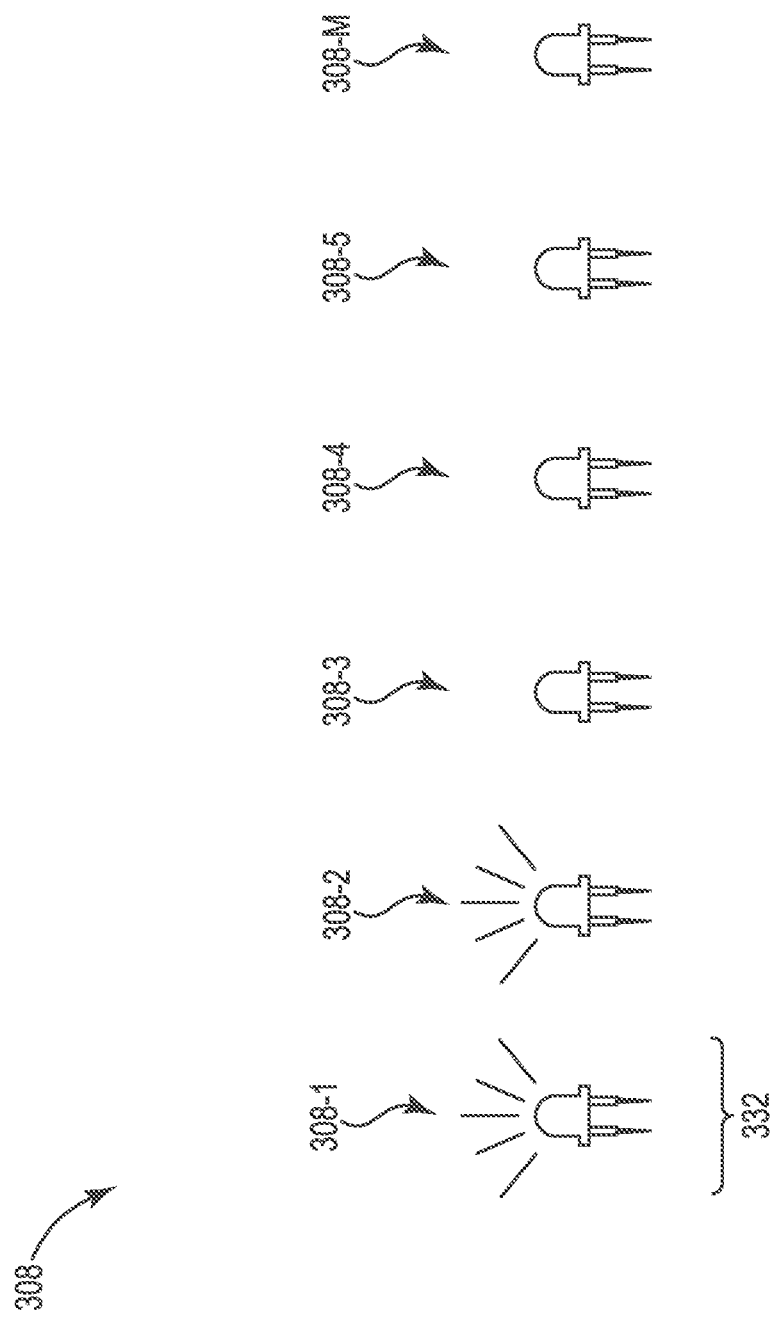
FIG. 3 is a number of LEDs displaying a good flow condition from a flow condition testing procedure of an aspirating smoke detector device, in accordance with one or more embodiments of the present disclosure.

FIG. 3 is a number of LEDs displaying a good flow condition from a flow condition testing procedure of an aspirating smoke detector device, in accordance with one or more embodiments of the present disclosure. The LEDs 308-1, 308-2, 308-3, 308-4, 308-5, 308-M (referred to collectively herein as LEDs 308) can include a second group 332 of LEDs 308.

As previously described in connection with FIG. 1, an aspirating smoke detector device can perform a flow condition testing procedure. For example, a determined flow rate of a gas (e.g., 0.7 L/min) can be compared with a threshold flow rate (e.g., 1 L/min) to determine whether the determined flow rate is above or below the threshold flow rate for a predetermined period of time. In an example in which the determined flow rate is below the threshold flow rate for the predetermined period of time, the aspirating smoke detector device can determine the flow condition to be a good flow condition. The aspirating smoke detector device can utilize the LEDs 308 included in the aspirating smoke detector device to display the flow condition, as is further described herein.

For example, the aspirating smoke detector device can cause a second group 332 of LEDs 308 to emit a first color in response to the flow rate being within a second flow rate range, where the first color corresponds to a good flow condition. For example, the second flow rate range can be 0.6 L/min to 1 L/min. As the determined flow rate is 0.7 L/min, the aspirating smoke detector device can determine the flow rate is within the second flow rate range (e.g., and less than the threshold flow rate of 1 L/min), where the second flow rate range includes flow rates that are still an acceptable flow rate. Accordingly, the aspirating smoke detector device can cause the LED 308-1 and 308-2 (e.g., the second group of LEDs 332) to light up the first color (e.g., green) to indicate the flow rate is within the second flow rate range, is below the threshold flow rate for a predetermined period of time, and the flow condition is a good flow condition.

Figure 4:
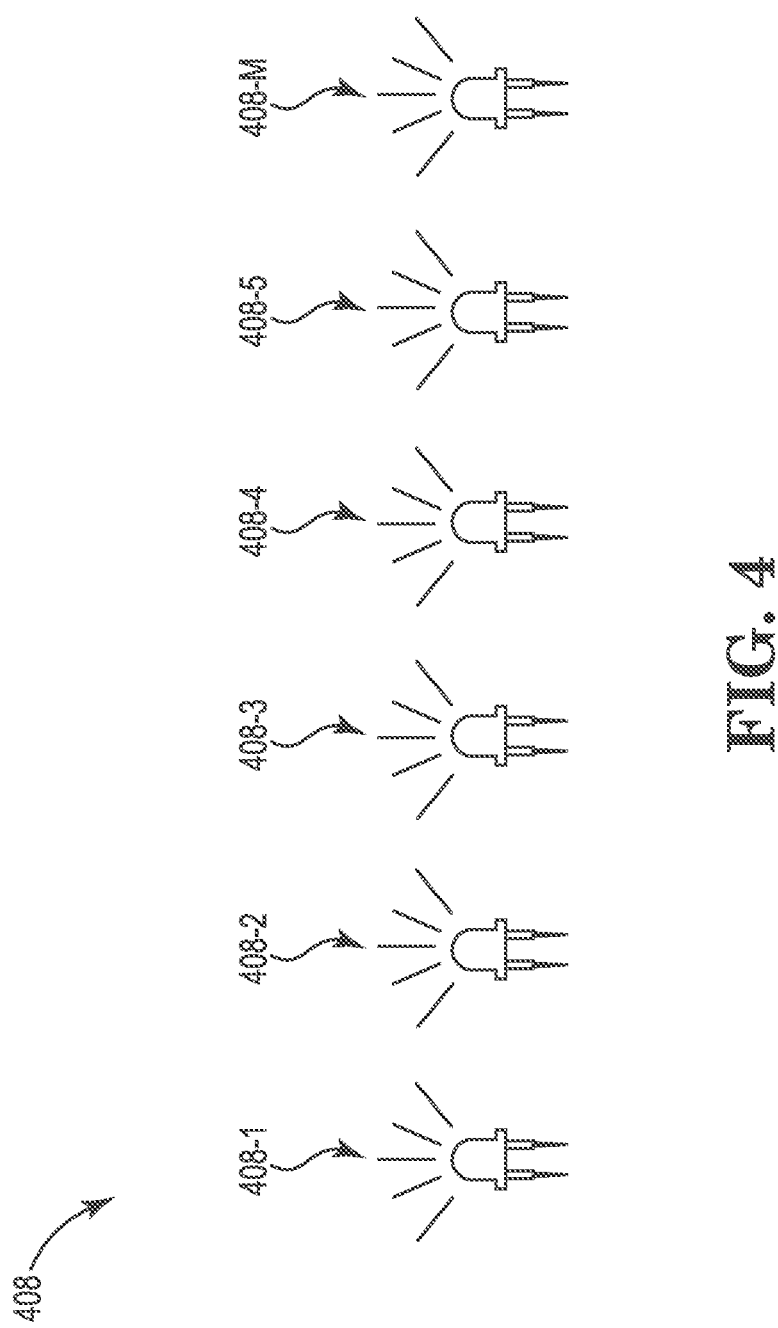
FIG. 4 is a number of LEDs displaying a bad flow condition from a flow condition testing procedure of an aspirating smoke detector device, in accordance with one or more embodiments of the present disclosure.

FIG. 4 is a number of LEDs 408 displaying a bad flow condition from a flow condition testing procedure of an aspirating smoke detector device, in accordance with one or more embodiments of the present disclosure.

As previously described in connection with FIG. 1, an aspirating smoke detector device can perform a flow condition testing procedure. For example, a determined flow rate of a gas (e.g., 2 L/min) can be compared with a threshold flow rate (e.g., 1 L/min) to determine whether the determined flow rate is above or below the threshold flow rate for a predetermined period of time. In an example in which the determined flow rate is above the threshold flow rate for the predetermined period of time, the aspirating smoke detector device can determine the flow condition to be a bad flow condition. The aspirating smoke detector device can utilize the LEDs 408 included in the aspirating smoke detector device to display the flow condition, as is further described herein.

For example, the aspirating smoke detector device can cause the number of LEDs 408 to emit a second color in response to the flow rate being outside of the first flow rate range, the second flow rate range, and being above a threshold flow rate, where the threshold flow rate exceeds the second flow rate range and the second color corresponds to a bad flow condition. For example, the second flow rate range can be 0.6 L/min to 1 L/min, and the threshold flow rate can be 1 L/min. As the determined flow rate is 2 L/min, the aspirating smoke detector device can determine the flow rate is outside of the second flow rate range and above the threshold flow rate. Accordingly, the aspirating smoke detector device can cause the LEDs 408 to light up the second color (e.g., red) to indicate the flow rate is above the threshold flow rate for a predetermined period of time and the flow condition is a bad flow condition.

A flow condition testing procedure of an aspirating smoke detector device, according to the present disclosure, can allow for flow condition testing of an aspirating smoke detector device and its associated pipe sampling network to determine whether the pipe sampling network includes cracks or other mechanisms in which leaks can allow gas to seep into or out of the pipe sampling network. Such an approach can allow for an easier and more convenient method to test an aspirating smoke detector device and pipe sampling network as compared with previous approaches.

Figure 5:
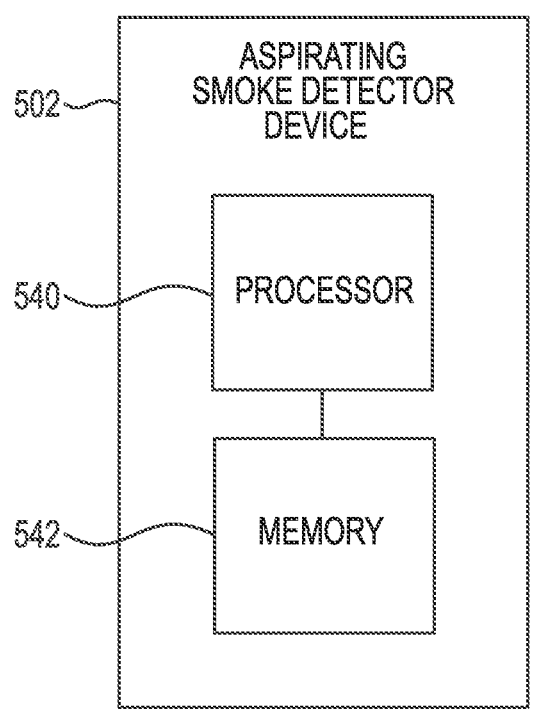
FIG. 5 is an aspirating smoke detector device for a flow condition testing procedure of the aspirating smoke detector device, in accordance with one or more embodiments of the present disclosure.

FIG. 5 is an aspirating smoke detector device 502 for a flow condition testing procedure of the aspirating smoke detector device, in accordance with one or more embodiments of the present disclosure. As illustrated in FIG. 5, the aspirating smoke detector device 502 can include a memory 542, and a processor 540 for a flow condition testing procedure of the aspirating smoke detector device in accordance with the present disclosure.

The memory 542 can be any type of storage medium that can be accessed by the processor 540 to perform various examples of the present disclosure. For example, the memory 542 can be a non-transitory computer readable medium having computer readable instructions (e.g., computer program instructions) stored thereon that are executable by the processor 540 for a flow condition testing procedure of an aspirating smoke detector device in accordance with the present disclosure. The computer readable instructions can be executable by the processor 540 to redundantly perform the flow condition testing procedure of an aspirating smoke detector device.

The memory 542 can be volatile or nonvolatile memory. The memory 542 can also be removable (e.g., portable) memory, or non-removable (e.g., internal) memory. For example, the memory 542 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 542 is illustrated as being located within aspirating smoke detector device 502, embodiments of the present disclosure are not so limited. For example, memory 542 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An aspirating smoke detector device, comprising:
   a blower to draw gas into the aspirating smoke detector device for a flow condition testing procedure for a pipe sampling network, wherein the aspirating smoke detector device is connected to the pipe sampling network;
   a sensor;
   a memory; and
   a processor configured to execute executable instructions stored in the memory to:
      determine, via the sensor, a volumetric flow rate of the gas into the aspirating smoke detector device;
      compare the volumetric flow rate of the gas to a threshold flow rate;
      determine, in response to the volumetric flow rate of the gas being above the threshold flow rate, a flow condition to be a bad flow condition, wherein the bad flow condition indicates a leak existing in the pipe sampling network;
      determine, in response to the volumetric flow rate of the gas being below the threshold flow rate for at least a predetermined period of time after initiation of the flow condition testing procedure such that a low-pressure condition forms in the pipe sampling network, the flow condition to be a good flow condition; and
      cause the flow condition to be displayed.

2. The aspirating smoke detector device of claim 1, wherein:
   the aspirating smoke detector device further comprises a number of light emitting diodes (LEDs); and
   the processor is configured to cause the flow condition to be displayed via the number of LEDs.

3. The aspirating smoke detector device of claim 1, wherein:
   the aspirating smoke detector device further comprises a user interface; and
   the processor is configured to cause the volumetric flow rate and the flow condition to be displayed via the user interface.

4. The aspirating smoke detector device of claim 1, wherein the sensor is an ultrasonic sensor.

5. A system for a flow condition testing procedure of an aspirating smoke detector device, comprising:
   a pipe sampling network including a sampling port at a sampling location;
   an inlet pipe connected to the pipe sampling network; and
   an aspirating smoke detector device, comprising:
      a blower connected to the inlet pipe to draw gas into the aspirating smoke detector device through the inlet pipe for a flow condition testing procedure for the pipe sampling network;
      a sensor; and
      a processor configured to:
         determine, via the sensor, a volumetric flow rate of the gas into the aspirating smoke detector device during a flow condition testing procedure of the aspirating smoke detector device;
         compare the volumetric flow rate of the gas to a threshold flow rate;
         determine, in response to the volumetric flow rate of the gas being above the threshold flow rate, a flow condition of the pipe sampling network to be a bad flow condition, wherein the bad flow condition indicates a leak existing in the pipe sampling network such that gas outside of the pipe sampling network is improperly entering the pipe sampling network during the flow condition testing procedure; and
         determine, in response to the volumetric flow rate of the gas being below the threshold flow rate for at least a predetermined period of time after initiation of the flow condition testing procedure such that a low-pressure condition forms in the pipe sampling network, the flow condition to be a good flow condition, wherein the good flow condition indicates no leaks existing in the pipe sampling network such that gas outside of the pipe sampling network is not improperly entering the pipe sampling network during the flow condition testing procedure; and
         cause the flow condition to be displayed.

6. The system of claim 5, wherein the sampling port is obstructed during the flow condition testing procedure such that gas outside of the pipe sampling network at the sampling location does not enter the pipe sampling network.

7. The system of claim 5, wherein the aspirating smoke detector device includes a button such that the processor is configured to execute the flow condition testing procedure in response to an input received via the button.

8. The system of claim 5, wherein:
   the system further includes a mobile device connected to the aspirating smoke detector device via a wireless connection; and
   the mobile device includes a user interface configured to display at least one of the volumetric flow rate and the flow condition.

9. The system of claim 8, wherein in response to an input to the user interface of the mobile device, the mobile device is configured to cause the processor to execute the flow condition testing procedure.

* * * * *